United States Patent Office 2,966,727
Patented Jan. 3, 1961

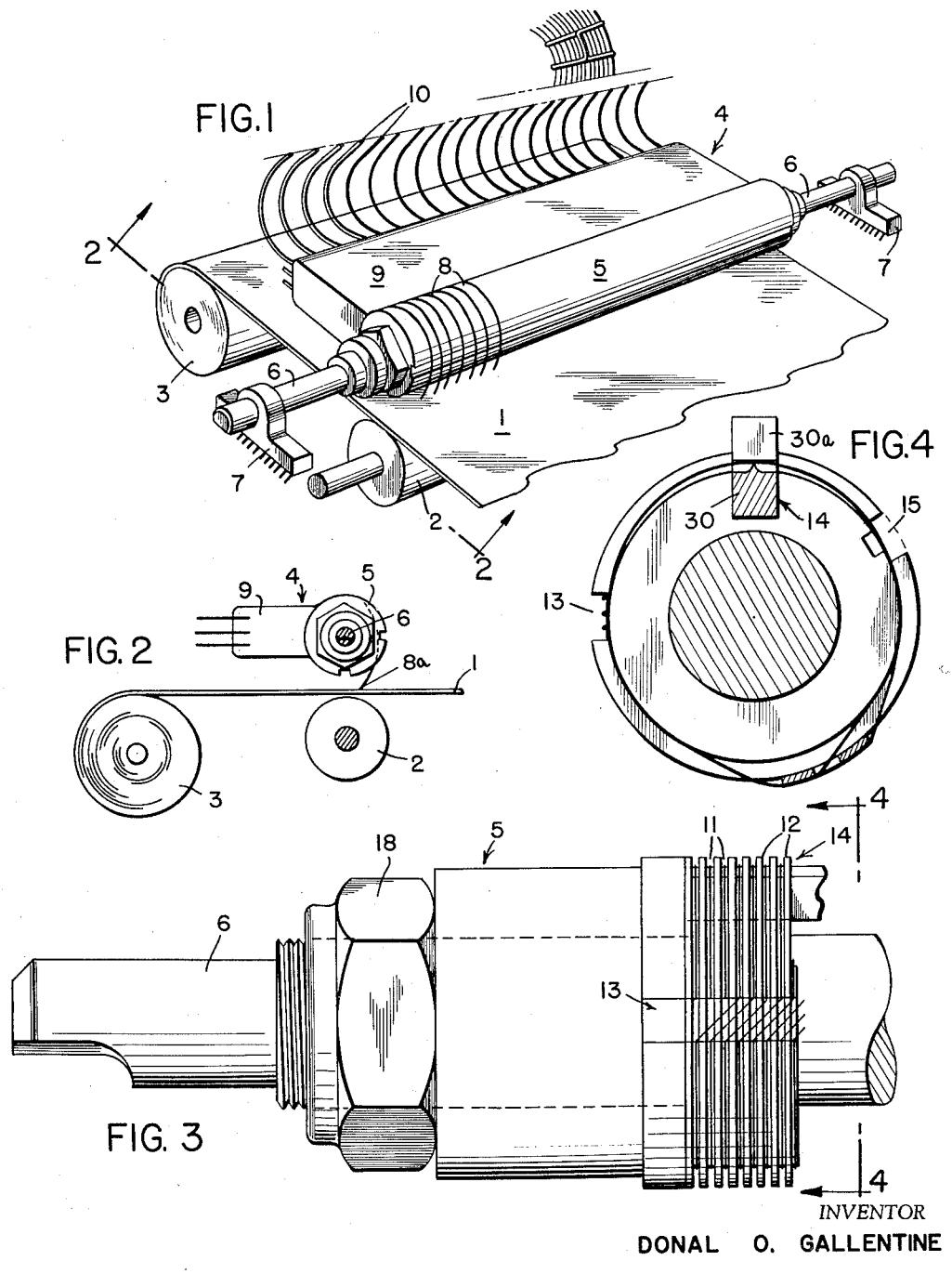

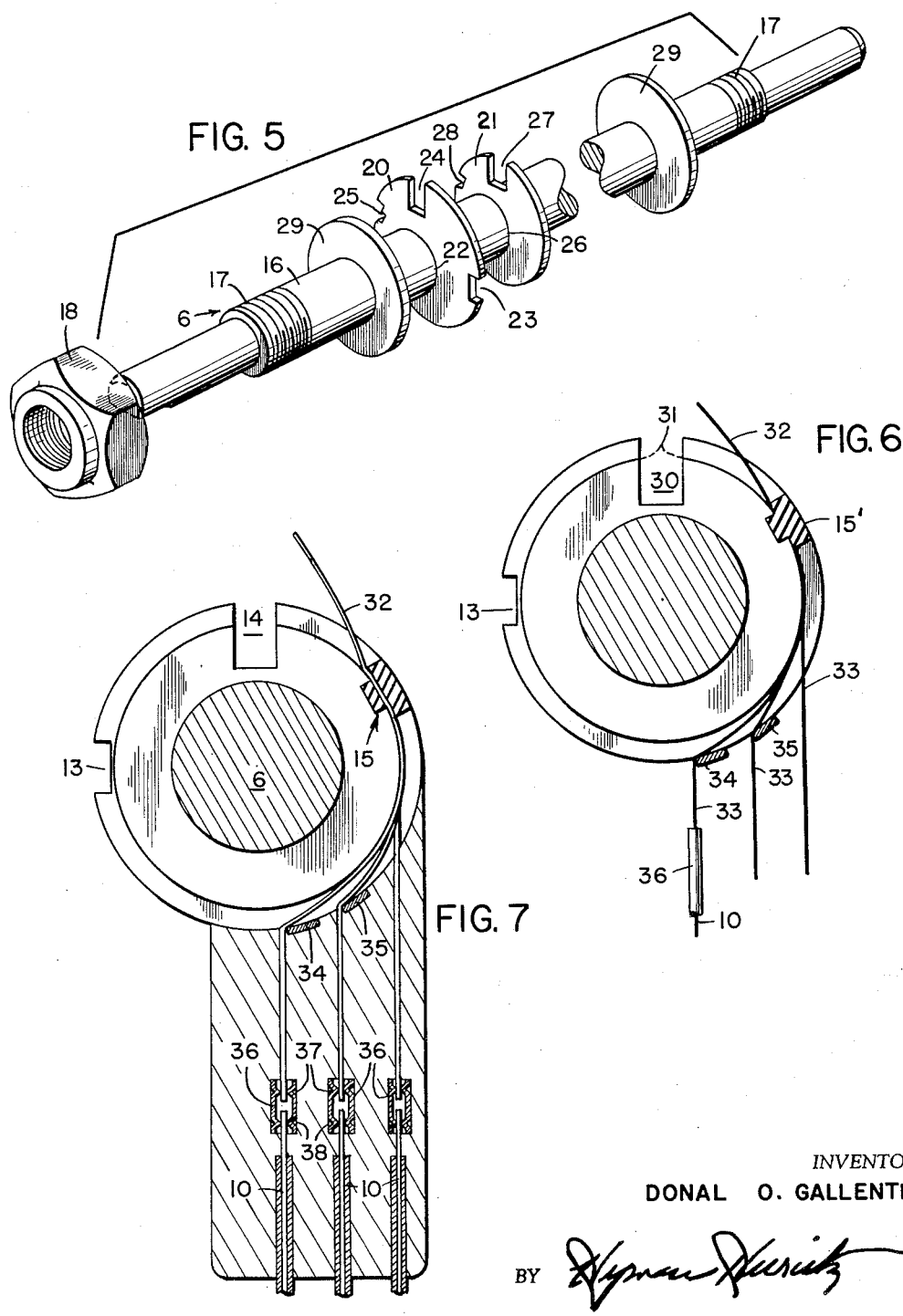

2,966,727

STYLUS ASSEMBLY

Donal O. Gallentine, Eau Gallie, Fla., assignor to Radiation, Inc., Melbourne, Fla., a corporation of Florida Filed Nov. 1, 1956, Ser. No. 619,717

7 Claims. (Cl. 29—155.5)

The present invention relates generally to recording styli and more particularly to a multiple recording stylus assembly having a large number of closely spaced styli adapted for recording on an electro-responsive recording medium.

An electro-responsive recording medium such as Teledeltos paper is discolored by the passage of an electric current therethrough, the degree of discoloration depending upon the strength of the electric current and the length of time it is applied. The electric current may be applied to the recording medium by passing the medium between a conductive stylus engaging one surface of the paper and a conductive platen engaging the other surface of the paper. Discoloration of the paper is a local effect, that is, it occurs only in small area adjacent the point of contact between the individual styli and the paper and it is, therefore, possible to space closely a plurality of styli to provide a large number of adjacent indications in a relatively small area without fear that the indications will overlap and become indistinguishable. Difficulties arise, however, in a multiple stylus assembly capable of recording information in a plurality of closely spaced channels on a continuously moving strip of recording paper, due to transverse displacement of the individual styli as a result of forces applied thereto by the moving paper. Excessive transverse movement is undesirable since it may bring one stylus into contact with another or produce overlapping indications. The magnitude of this problem becomes apparent upon consideration of the structural feature of a specific stylus assembly wherein 213 styli each having a diameter of 0.005 inch are assembled on a support having a length of 3.9 inches, which provides a spacing between the individual styli of only 0.013 inch. Another problem encountered in providing a suitable multiple stylus assembly is the placement of the wires on the assembly. Due to the close spacing of the stylus wires, the individual placement and alignment of the styli on a supporting structure would be a very tedious and highly expensive operation. Further complications in the fabrication of such an assembly arise as a result of the necessity of accurately aligning the ends of the styli. The contact resistance between the paper and individual stylus is dependent on the contact pressure therebetween and this pressure must be substantially the same for all styli if uniform recording density in different channels is to be obtained in response to signals of equal magnitude.

The present invention is a continuation-in-part of my co-pending application, Serial No. 532,454, filed September 6, 1955, for Stylus Assembly. In my co-pending application the problems and difficulties enumerated above were overcome by providing a cylindrical stylus support having a plurality of spaced circumferential grooves and two axially extending grooves having a predetermined relative circumferential spacing. A cutter bar having a cutting surface is placed in one of the axial grooves with its cutting surface exposed; that is, extending radially outward of the cylindrical support. A first length of wire is wound once about a first circumferential groove and then passed axially through the second axially extending groove to a further circumferential groove having a predetermined spacing from the first groove. The wire is then wound once about the further circumferential groove, and this winding procedure is repeated until the length of the stylus support has been covered. The segments of wire lying in the second axially extending groove are bounded to the bottom thereof and the length of wire is cut into individual stylus wires by pressing the turns against the cutting surface of the cutting bar. The inherent resiliency of the wire causes the unbounded portions of the wires to spring outwardly from the stylus support, one end of each turn of wire providing a terminal to which electrical connections may be made and the other end of each turn of wire providing a recording stylus. By winding the turns of wire in adjacent circumferential grooves a complete set of stylus wires may be wound from a single length of wire. In a preferred embodiment of the aforesaid invention a first length of wire is wound about every third circumferential groove taken in succession and commencing with the first groove of the support and second and third lengths of wire are then wound in every third groove commencing respectively with the second and third circumferential grooves of the support. This winding procedure was preferred so as to provide adequate support for the styli wires since with this arrangement the wires were bonded to the support over a length equivalent to the spacing between three adjacent circumferential grooves. The ends of the wires to which electrical connections are to be made are connected to lead-in wires by means of a copper tube into which the lead-in wire and an associated styli wire are inserted. Each copper tube is crimped to engage its associated wires and all of the tubes are then imbedded in a plastic body to provide adequate support for the tubes and the lead-in and stylus wires adjacent thereto. In consequence of the small diameter of the styli wires occasionally one of these wires is broken when the copper tube is crimped into engagement with it or a stylus wire may become damaged during use of the assembly. Due to the method of fabricating the styli assembly in accordance with the aforesaid patent application, it has been found to be quite difficult to replace a single stylus wire. As previously pointed out bonding of the wires to the stylus support was accomplished by filling the second axial groove, through which portions of all the turns of wire extend, with a bonding material. Consequently, if one of the stylus wires is broken it is necessary to remove the bonding material from one of the wires in this axially extending groove without disturbing the other wires therein. In practice it has been found that in attempting to unbond a single wire the adjacent wires are often loosened or actually become completely detached from the assembly and the entire assembly must be discarded.

In accordance with the present invention the problem previously encountered in replacing a single stylus wire is overcome by employing a third axially extending groove which intersects each of the circumferential grooves at a location where its associated stylus wire is perpendicular to the third groove. Bonding material is now applied to the third groove to bond the stylus wires to the stylus assembly and no bonding material is applied to the second axially-extending groove in which is positioned portions of all of the wires. Consequently, the stylus wires are bonded to the stylus support as distinct, spaced locations and if one of the stylus wires is broken during assembly of the apparatus, the bonding material need be removed from only a single circumferential groove and the stylus wires in the adjacent grooves are unaffected. Therefore, a single stylus wire may be replaced with a minimum of complication and expense. In the assembly disclosed by the aforesaid patent application, adequate support was provided for the styli wires by passing them through one of the axially extending grooves between every third circumferential groove, while in accordance with the present invention, adequate support for the styli wires is provided by extending the third axial groove below the bottom of the circumferential grooves in which the styli wires are wound so that the styli wires are imbedded in the bonding material and a large area of contact is provided between the bonding material and the stylus wires.

It is, therefore, an object of the present invention to provide an easily fabricated multiple styli assembly wherein each stylus wire has a high degree of lateral stability and wherein each stylus wire may be replaced without affecting the other wires of the assembly.

It is another object of the present invention to provide a multiple stylus assembly having an elongated stylus support and a plurality of closely spaced styli arranged along the longitudinal axis of the support wherein the support has a plurality of longitudinally spaced circumferential grooves in which the styli wires are positioned and wherein the individual styli wires may be replaced without affecting the other styli secured to the support.

Still another object of the present invention is to provide a method of fabricating a multiple stylus assembly wherein a length of wire is wound about an elongated member to provide a single layer of spaced turns, each turn being individually secured to the elongated member at axially spaced locations which method of fabrication allows the individual stylus wires to be readily replaced.

The above and still further objects, features and advantages of the present invention will become apparent upon consideration of the following detailed description of one specific embodiment thereof, especially when taken in conjunction with the accompanying drawings, wherein:

Figure 1 illustrates a recording system employing the multiple stylus assembly of the present invention, wherein the stylus assembly is diagrammatically illustrated;

Figure 2 is a cross-sectional view taken along line 2—2 of Figure 1;

Figure 3 is a detailed side elevation of the apparatus of the present invention;

Figure 4 is a cross-sectional view taken along line 4—4 of Figure 3;

Figure 5 is a view in perspective, illustrating one method of assembly of a stylus support in accordance with the present invention;

Figure 6 is a cross-sectional view corresponding to Figure 4 but illustrating the condition of the assembly at a later time in its fabrication; and Figure 7 is a view similar to Figure 6, but illustrating in addition a plastic body for supporting the stylus wires.

Figure 1 of the accompanying drawings illustrates a recording apparatus employing the stylus assembly of the present invention for recording signals from a plurality of information channels, each in a different longitudinally extending recording, channel on a suitable recording paper.

Referring more specifically to the apparatus of Figure 1, recording paper 1 is fed at a uniform rate from a supply reel (not shown) over a rotating electrically conductive platen 2, to a take-up reel 3. Supported above the paper 1 and the platen 2 is a stylus assembly 4, including an electrically non-conductive, cylindrical stylus support 5 extending across the width of the paper 1 perpendicular to the direction of movement thereof. The stylus support may be carried on a shaft 6, secured at its ends to stationary supports 7 to fix the position of the stylus assembly above the paper 1.

A plurality of longitudinally-spaced stylus wires 8 are suitably secured to a portion of the circumference of the stylus support 5, and have one end, 8a (see Figure 2) extending downwardly into sliding contact with the paper 1 directly above the platen 2. The other end of each of the stylus wires 8 extends outwardly from the stylus support 5 at a suitable location, and is connected to a different one of a plurality of lead-in wires 10. The junction of the wires 8 and 10 is enclosed within a plastic insulating body 9 to maintain the wires separated, and further to support the wires to prevent undue flexing thereof adjacent the stylus support 5, which might otherwise lead to breakage of the wires.

Each of the lead-in wires 10 is connected in the output circuit of a different information channel (not shown) and has applied thereto an electrical current, which varies in amplitude in accordance with the information supplied to the information channel. It is not intended to limit the present invention to recording on a current responsive paper and a voltage responsive recording medium 1 may be employed in which case a voltage is applied between the stylus wires 8 and the platen 2. For the purposes of illustration only the present invention is described in conjunction with a current responsive paper 1, such as Teledeltos paper; the paper 1 being disposed in a series circuit comprising a stylus wire 8, the paper 1 and the platen 2. Teledeltos paper is an electrically conductive paper which is discolored by the passage of an electric current therethrough, the degree of discoloration depending upon the magnitude of the curent passed. The varying current passed through the series circuit actuates the paper 1 adjacent each stylus wire to provide a permanent record of the current applied, each record being disposed in a different longitudinally extending channel on the paper 1.

In order to insure faithful reproduction of the information in the various information channels, the stylus assembly of the present invention must insure that the ends 8a of the stylus wires are accurately aligned, and that the contact pressure between each of the stylus wires 8 and the paper 1 is uniform. This is particularly important when recording on Teledeltos paper since the contact resistance between the wires 8 and the paper 1 must be substantially uniform in order for the current flowing through the paper to be an accurate reproduction of the information applied to the leads 10. Further, where it is desirable to record a large number of closely spaced channels on the paper 1, the stylus support 4 must impart a high degree of lateral stability to the styli wires 8 to prevent short circuits therebetween, or an overlapping of the recordings.

For a complete description of the structural arrangement and the method of fabrication of the stylus assembly of the present invention reference is made to Figures 3–7 of the accompanying drawings, the illustrations in Figures 1 and 2 being merely diagrammatic.

The stylus support 5 of the stylus assembly 4 is provided with a plurality of axially spaced circumferential grooves 11 (see Figure 3) the portions of the stylus support 5 between the circumferential grooves 11 providing a plurality of spaced circumferential guides 12. The stylus support 5 is further provided with three axially-extending grooves 13, 14 and 15 (see Figure 4), having a predetermined angular or circumferential spacing therebetween. The depth of the groove 13 is approximately equal to the depth of the circumferential grooves 11 while the depth of the groove 14 is greater than the depth of the grooves 11. The groove 15 is also deeper than the grooves 11, the portion of the groove 15 extending from the bottoms of the grooves 11 toward the center of the support 5 having a smaller circumferential length than the portion of the groove 15 extending outwardly from the bottom of the grooves 11. The elements employed in the stylus support structure depends upon the method of fabricating the support 5 and therefore discussion of this feature follows at this point.

The stylus support 5 may be fabricated as a unitary molded body employing well-known molding techniques, in which event the shaft 6 comprises two separate axially aligned extensions of the body each shaft extending from a different end. Such a method of fabrication lends itself to large scale production where the initial cost of setting up the molding apparatus is more than offset by the saving of fabrication time over extended periods of production.

A method of fabricating the stylus support that lends itself to small scale production employs a shaft 6 (see Figure 5), on which is assembled a plurality of alternately arranged discs 20 and 21, the discs 20 and 21 providing the various grooves 11, 13, 14 and 15.

Referring specifically to Figure 5 which illustrates elements employed in the latter method of fabrication of the stylus support 5, the shaft 6 is provided with an enlarged central portion 16 of a length somewhat greater than the ultimate length of the completed support 5. Each end of the enlarged portion 16 is provided with screw threads 17, and two stop-nuts 18 are utilized each for engaging the thread 17 at a different end of the enlarged portion 16. Each disc 20 is a thin circular disc of insulating material having a centrally disposed aperture 22 and three radial notches 23, 24 and 25. The notch 24 is the deepest of the three notches, while the notch 25 has an enlarged upper portion of a depth equal to the depth of the notch 23 and a lower portion which is deeper than the notch 23 but not as deep as the notch or groove 24. For the purposes of illustration only the notches 23 and 24 are displaced about the circumference of the disc 20 at 90° with respect to one another and the notches 24 and 25 are disposed at approximately 70 degrees with respect to one another. Each disc 21 comprises a thin circular disc of insulating material of a radius equal to the radius of the bottom of the groove 23 of the disc 20. Each disc 21 has a centrally disposed circular aperture 26 and two spaced radial notches 27 and 28. The distance from the bottom of the notch 27 to the center of the disc 21 is equal to the distance from the bottom of the notch 24 to the center of the disc 20. The circumferential spacing between the notches or grooves 27 and 28 is equal to the spacing between the notches or grooves 24 and 25 on the disc 20 and the distance of the bottom of the notch 28 from the center of the disc 21 is equal to the distance of the bottom of the notch 25 from the center of the disc 20 while the circumferential length of the notch 28 is equal to the circumferential length of the notch of the lower portion of the slot 25 of the disc 20. The diameters of the apertures 22 and 26 of the disc 20 and 21 are both approximately equal to the outer diameter of the enlarged portion 16 of the shaft 6.

In assembling the stylus support 5, a stop-nut 18 is threaded onto the thread 17 at one end of the enlarged portion 16 of the shaft 6 and a washer 29 having a diameter equal to the diameter of the disc 21 and a central aperture equal to the diameter of the portion 16 of shaft 6 is slipped over the other end of the shaft 6 and brought into abutting relation with the stop-nut 18. A disc 20 is then slipped over the other end of the shaft 6 and is followed alternately by discs 24 and 20 until the desired length of the stylus support 5 is attained. A second washer 29 is then placed on the other end of the shaft 6 and a second stop-nut 18 is threaded on the threads 17 at the other end of the shaft 6. The notches 24 and 27 of the discs 20 and 21 are then aligned thereby also aligning the notches 25 and 28 of the discs 20 and 21, respectively, and the notches 23 of the discs 20. Thereafter, the stop-nuts 18 are tightened to maintain the positioning of the discs. The discs 20 provide the guides 12 and the discs 21 provide the grooves 11 of the stylus support 5 illustrated in Figure 3 of the accompanying drawings. The aligned notches 23 provide the axially extending groove 13, the aligned notches 24 and 27 provide the axially extending groove 14 and the aligned notches 25 and 28 provide the axially extending groove 15 of the stylus support 6.

Continuing the description of the method of fabricating the stylus assembly 4 of the present invention, and referring specifically to Figure 4, a cutter bar 30 having a cutting edge 31 is placed in the groove 14 of the stylus support 5, fabricated by either of the methods discussed above or by some other equally suitable method, such as machining in a gauged mill.

The lateral and transverse dimensions of the cutter bar 30 are approximately equal to the corresponding dimensions of the groove 14 so as to insure accurate alignment of the bar 30 in the groove 14. The cutting edge 31 is directed outwardly of the groove 14 and the height of the cutter bar 30 is such that the cutting surface 31 is above the periphery of the bottom surface of the circumferential grooves 11 but below the periphery of the circumferential surfaces of the guides 12. One end of a first length of suitable stylus wire such as tungsten wire is disposed in the first groove 11 and is bonded to the side of one of the guides 12, being radially positioned adjacent the bottom of the groove 11 and circumferentially positioned between the grooves 13 and 14. The wire 8 is wound clockwise in the groove 11 as viewed in Figure 4, passing over the cutting surface 31 of the cutter bar 30 and entering the groove 13 at the end of the turn. The wire is then extended from the intersection of the grooves 11 and 13 to the intersection of the fourth groove 11 and the groove 13 as illustrated in Figure 3. Wire 8 is then wound clockwise through the fourth groove 11 and this winding procedure is continued until every third groove 11, starting with the first, has been provided with a turn of wire. Thereafter, the other end of the wire 8 is cemented to the third from last guide 12 between the grooves 15 and 13. A second length of wire is then wound on the stylus support 5 starting with the second groove 11 and entering every third groove 11 thereafter and this is followed by winding a third length of wire on the support 5 starting with the third groove. The axially extending groove or slot 15 is then filled with a bonding material 15' to secure the wires to the stylus support 5. Since the stylus wires are wound around the discs 21, they are suspended above the bottom of the smaller and inner portion of the groove 15 and consequently when the groove 15 is filled with a bonding material 15', the wires are imbedded in the material and are adequately supported and secured to the support 5. In order to cut the wires 8, a flat metal bar 30a is made to bear on the portion of the wires contacting the cutting surface 31 of the cutter bar 30 with sufficient force to shear the wires. The portion of each wire 8 which prior to cutting extended from the cutting edge 31 of the cutter bar 30 in one groove 11 to the intersection of the groove 13 and the other groove 11 in which the wire is wound, is cut off to remove the bent portion of each wire which extended through the groove 13. This latter cutting operation is facilitated due to the natural resilience of the stylus wire which causes the free ends to spring outwardly away from the support 5. After removal of the bent sections of the wires 8, the wires include a portion 32 extending counterclockwise from the groove 15 and a portion 33 extending clockwise from the groove 15 both as viewed in Figure 6. The ends of the portions 32 of wires 8 correspond with the ends 8a of the stylus wires in Figures 1 and 2 and are intended to engage the recording paper 1 during a recording operation. Inasmuch as the wires 8 are all cut simultaneously along the edge 31 of the cutter bar 30, the ends 8a are accurately aligned and insure substantially equal contact pressure between the wires 8 and the recording paper. Further, the radius of curvature of the portions 32 of the wires 8 is such with respect to the radius of curvature of the stylus support 5 that at least half of the length of each portion 32 is disposed between its associated guides 12 thereby to impart a high degree of lateral stability to the wires 8.

The winding of the turns of the wires 8 with a pitch of three is not essential to the method of fabrication of the present invention and any turn pitch may be employed including a pitch of one. It is preferred, however, to employ a winding pitch of three in order to divide the various portions 33 of the stylus wires 8 into three distinct groups which emerge from between the guides 12 at distinct circumferential locations. The division of the portions 33 of the stylus wires 8 into three groups facilitates connection of the input leads 10 thereto and eases the problem of preventing contact between adjacent wires. Proceeding with a description of the method for dividing the terminal portions 33 of the wires into three distinct groups, an axially extending strip 34 of insulating material, see Figures 4 and 6, is cemented to the guides 12, intermediate the grooves 13 and 14, and approximately opposite to the groove 14, immediately after winding of the first length of wire 8. The second length of wire is wound over this strip 34 and after winding of the second length of wire a second axially-extending insulating strip 35 spaced from the first strip 34 and disposed between the strip 34 and the groove 15 is cemented to the surfaces of the guides 12. Thereafter, the third length of wire is wound and passes over the two strips 34 and 35. When the three wires are subsequently cut, the terminal portions 33 of the first, second and third lengths of wire emerge from between the guides 12 at spaced intervals from one another as determined by the spacing between the strips 34 and 35. The portions 33 of first length of wire emerges from between the guides 12 at a point between the strip 34 and the groove 13, the portions 33 of the second length of wire emerge at a point between the strips 34 and 35 and the portions 33 of the third length of wire emerge from guides 12 at a point between the strip 35 and the groove 15, this point being determined by the radius of curvature of the wire.

Referring to Figures 6 and 7 of the accompanying drawings, the portion 33 of each of the stylus wires 8 is connected by means of a short tube 36 of copper or other suitable conductive material, to a different lead-in wire 10. One end of each copper tube 36 is slipped over the end of a portion 33 of the wire 8 and crimped into engagement therewith as indicated by the reference numeral 37 in the accompanying drawings. The end of the lead-in wire 10 is inserted into the other end of the tube 36 and the tube 36 is crimped into engagement therewith, as indicated by the reference numeral 38. Obviously, other means may be employed within the scope of the present invention for connecting the wires 8 to the wires 10. After all the connections have been made, the copper tubes 36 are suitably positioned with respect to the stylus support 5, the tubes being positioned approximately perpendicular to the surface of the support 5 adjacent the point of emergence of its associated wire 8 from between the guides 12. A plastic body 9, as illustrated in Figure 7, is then molded about the copper tubes 36, a short length of the lead-in wire 10 adjacent thereto, portions 33 of the wires 8 extending from the styli support 5 to the copper tubes 36 and about adjacent sections of the guides 12 to complete fabrication of the stylus assembly 4. The plastic body provided by the molding operation is secured to the stylus support 5 by engagement with the top and side walls of the guides 12, and supports the end portions of the wires 8 and 10 adjacent their point of connection, thereby greatly reducing wire breakage which might otherwise occur during shipping and installation of the assembly 4.

The improvement of the present invention over that of the aforesaid co-pending application lies in the method of bonding the individual stylus wires 8 to the stylus support 5.

In accordance with the present invention the bonding material 15' is applied to the groove 15 which communicates with the individual grooves 11, each containing a single stylus wire 8. Therefore, if one of the stylus wires becomes defective for any reason, such as bending of a wire, breaking of a portion 33 while being clamped within the copper tube, or other causes, the bonding material may be removed from the region defined by the intersection of the groove 15 and groove 11 containing the damaged wire. Since no other stylus wires subsist in this region, there is no danger of weakening the bond between other wires of the assembly and the support 5. After the material has been removed, a new stylus wire may be readily secured to the support 5. Since during fabrication of the apparatus the portion of each wire extending from the cutting bar 30 through the groove 11 and through the groove 13 to the third groove 11 on the other side of the groove 13 is removed, there is no wire in any of the grooves 11 from the edge of the cutter bar counterclockwise, as viewed in Figure 4 to the insulating strip 34. Now when a broken stylus wire 8 is removed, a completely open continuous groove 11 is provided. Consequently, to replace a stylus wire, the damaged wire is first removed, a length of wire is wound in the appropriate groove 11 and bonding material is applied in sufficient quantity to refill the groove 15. The wire must be clamped and drawn taut during the interval required for the bonding material to dry and subsequently thereafter until the wire is cut against the cutting surface 31 of the cutter bar 30. The wire may then be released, the portion 33 being trimmed back to the desired length and then connected to a lead-in wire 10 as previously described.

It is apparent that the present invention provides an easily fabricated multiple stylus unit arranged such that individual stylus wires may be readily removed from the assembly and rapidly replaced with a new wire thereby eliminating the necessity of discarding an entire apparatus due to damage to one of the wires.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. The method of manufacturing a stylus assembly employing an elongated stylus support having a plurality of spaced transverse peripheral grooves and at least first and second transversely spaced axially-extending grooves, said method comprising winding a first section of wire in a first peripheral groove of the stylus support, passing a second section of the wire through the first axially-extending groove to a second peripheral groove having a predetermined spacing from the first peripheral groove, winding a third section of the wire in the second peripheral groove, securing at least one of the first and third sections of wire to the stylus assembly adjacent a surface provided by the second axially-extending groove and cutting at least one of the first and third sections of wire at a point spaced peripherally from the axially-extending grooves.

2. The method of manufacturing a stylus assembly employing an elongated stylus support having a plurality of spaced transverse peripheral grooves and at least first and second transversely spaced axially-extending grooves, said method comprising winding a first section of wire in a first peripheral groove of the stylus support, passing a second section of the wire through the first axially-extending groove to a second peripheral groove having a predetermined spacing from the first peripheral groove, winding a third section of the wire in the second peripheral groove, at least partially filling the second axially-extending groove with a bonding material to secure at least one of the first and third sections of wire to the support and cutting at least one of the first and third sections of wire at a point spaced peripherally from the axially-extending grooves.

3. The method of manufacturing a stylus assembly employing an elongated stylus support having a plurality of spaced transverse peripheral grooves and at least first and second transversely spaced axially-extending grooves, said method comprising winding a first section of wire in a first peripheral groove of the stylus support, passing a second section of the wire through the first axially-extending groove to a second peripheral groove having a predetermined spacing from the first peripheral groove, winding a third section of the wire in the second peripheral groove, continuing the procedure of winding sections of wire in peripheral grooves having the aforesaid predetermined spacing therebetween and passing sections of wire through the first axially-extending groove between the peripheral grooves in which sections of wire are wound until the end of the stylus support has been reached, at least partially filling the second axially-extending groove with a bonding material to secure the wire to the support and cutting all of the sections of wire in the peripheral grooves at points having equal peripheral spacing from the axially-extending grooves.

4. The method in accordance with claim 3, wherein the spacing between the peripheral grooves in which the wire is wound includes a predetermined number of peripheral grooves, winding additional wires, each additional wire being wound with the same spacing between peripheral sections as the first length and each being wound in a different one of the peripheral grooves included between the peripheral grooves in which the first length of wire is wound.

5. The method in accordance with claim 4, further including securing a plurality of axially-extending strips of insulating material to the periphery of the support, each strip being applied after winding one wire and before winding the next wire.

6. The method of manufacturing a stylus assembly employing an elongated stylus support having a plurality of spaced transverse peripheral grooves and at least first, second and third transversely spaced axially-extending grooves, said method comprising placing a cutter bar in a first axially-extending groove with its cutting surface directed radially outward from the support, winding a first section of wire in one peripheral groove of the stylus support, passing a second section of the wire through the second axially-extending groove to a second peripheral groove having a predetermined spacing from the one peripheral groove, winding a third section of the wire in the other peripheral groove, continuing the procedure of winding sections of wire in peripheral grooves having the aforesaid predetermined spacing therebetween and passing sections of wire through the first axially-extending groove between the peripheral grooves in which sections of wire are wound until the length of the stylus support has been reached, at least partially filling the third axially-extending groove with a bonding material to secure the wire to the support and cutting the wire by pressing the wire against the cutting surface of said cutter bar.

7. The combination according to claim 3 wherein the depth of at least a part of the second axially-extending groove is greater than the depths of the peripheral grooves and wherein the bonding material extends into said part of the second axially-extending groove.

References Cited in the file of this patent

UNITED STATES PATENTS

| | | |
|---|---|---|
| 2,009,205 | Randall et al. | July 23, 1935 |
| 2,241,602 | Kinyon | May 13, 1941 |
| 2,438,113 | Denmark | Mar. 23, 1948 |
| 2,444,026 | Bartelheim et al. | June 29, 1948 |
| 2,719,775 | Erving | Oct. 5, 1955 |
| 2,723,897 | Zabriskie | Nov. 15, 1955 |
| 2,743,507 | Kornei | May 1, 1956 |